No. 672,554. Patented Apr. 23, 1901.
R. HENKEL.
PAN SCRAPING AND CLEANING MACHINE.
(Application filed Dec. 28, 1900.)
(No Model.)
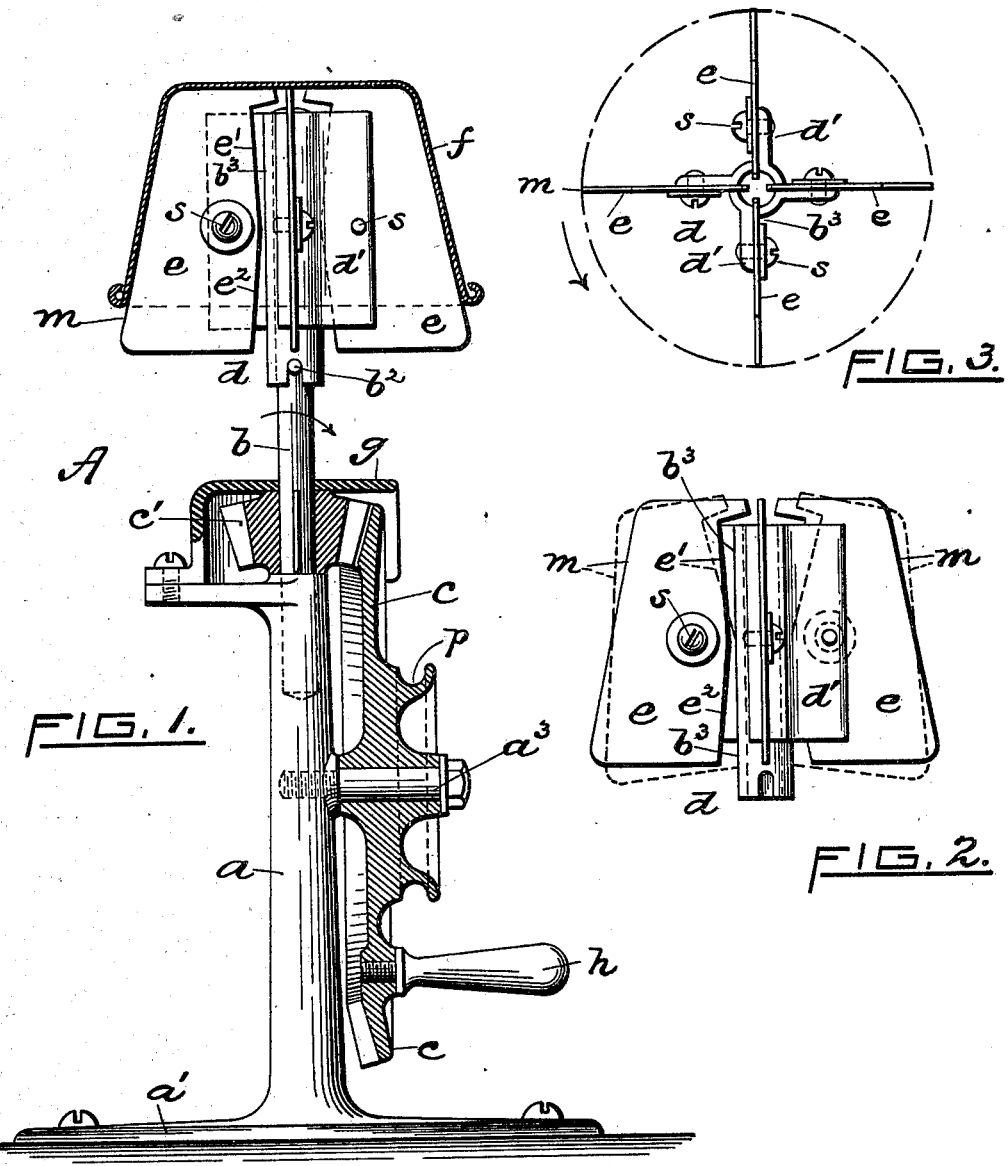
WITNESSES.
Charles T. Hannigan
Grace E. Smith
INVENTOR.
Robert Henkel.
by Geo. H. Remington & Co.
Attys.

UNITED STATES PATENT OFFICE.

ROBERT HENKEL, OF PROVIDENCE, RHODE ISLAND.

PAN SCRAPING AND CLEANING MACHINE.

SPECIFICATION forming part of Letters Patent No. 672,554, dated April 23, 1901.

Application filed December 28, 1900. Serial No. 41,368. No model.

*To all whom it may concern:*

Be it known that I, ROBERT HENKEL, a citizen of the United States of America, and a resident of the city and county of Providence, in the State of Rhode Island, have invented certain new and useful Improvements in Pan Scraping and Cleaning Machines, of which the following is a specification.

My invention relates to improvements in devices for cleaning and scraping cake-pans and other analogous round pans or baking-tins used by bakers; and it consists, essentially, of a mechanically-actuated revolving head or spider having a series of pivotally-mounted self-adjusting blades attached thereto adapted to conform within fixed limits to the beveled sides and bottom of the interior surface of the pan, whereby upon pressing the pan against the outer or peripheral edge of the revolving blades the latter operate to quickly scrape off and remove any particles of cake, bread, grease, &c., adhering thereto from the previous baking, all as will be more fully hereinafter set forth and claimed.

In bakeries, hotels, and other establishments where comparatively large quantities of cakes—as, for example, cup-cakes, cup-custards, &c.—are produced daily it is well known that in order to render the inner surface of the pans or tins perfectly smooth and clean after the cooked contents have been removed therefrom considerable time and labor must be consumed, and even then the result is more or less unsatisfactory. By means of my improved pan-cleaning machine the attendant is enabled to scrape and clean the pans in a much more expeditious and satisfactory manner and at a considerably-lessened cost.

In the accompanying sheet of drawings, Figure 1 is a side elevation, in partial section, of a pan-cleaning machine embodying my improvement. Fig. 2 is a side view of the head or spider detached from the machine, and Fig. 3 is a plan view of it.

A, again referring to the drawings, designates my improved pan scraping and cleaning machine as a whole. The standard or frame $a$ thereof has a base portion $a'$, adapted to be secured to a table, sink, or other suitable support. The upper portion of the frame is drilled to receive and form a step and bearing for the vertical spindle $b$. Rotary movement may be imparted to the spindle by means of the large bevel driving gear-wheel $c$, mounted on a stud $a^3$, secured to and extending from the side of the standard $a$, and the intermeshing pinion-gear $c'$, fixed to the said spindle. The driving-gear may be rotated by means of a handle $h$, or it may be driven by power transmitted through a traveling belt passing around the score-pulley $p$, fixed to the gear. In the latter case it is obvious that the handle should be first removed. The spindle $b$ extends upwardly beyond the pinion $c'$, so as to freely receive and drive the head or spider $d$, the lower end of the latter being slotted to receive the fixed pin or key $b^2$ of the spindle, as clearly shown. As drawn the head member is provided with a series of four longitudinally-extending wings $d'$, arranged at substantially right angles with its axis. At or near the center of each wing is located a swinging pivotally-mounted blade or scraper $e$, made of suitable material, as sheet-steel. These blades extend above the top end of the head $d$ and also inwardly toward the center. The outer or peripheral edge $m$ of the blade is inclined, so as to conform to the flaring sides of the pan or tin. In the drawings I have represented the device as more especially adapted to clean cup-cake pans—that is, pans having considerable depth, but being comparatively small in diameter. It will be seen that the inner edges of the blades are beveled in opposite directions from the pivot point or screw $s$, as indicated at $e'$ and $e^2$, the arrangement being such that the blades automatically adapt themselves, within certain limits, to pans having flaring sides varying in degree; or, in other words, when the upper beveled edge portions $e'$ bear against the adjacent vertical surfaces $b^3$ or hub of the spider the machine is then adapted to pans whose sides have the greatest inclination, and conversely when the lower beveled portions $e^2$ bear against said vertical surfaces $b^3$ the machine is adapted to pans having sides much less angular. (See dotted-line position in Fig. 2.) Thus it will be seen that to a certain extent the machine is self-adjusting with respect to the diameter of the pans and also to their flaring sides.

The manner of operating my machine for scraping and cleaning cake-pans may be described as follows: The attendant places the pan $f$ inverted over the top of the revolving head portion, at the same time yieldingly pressing it against the outer edges of the blades. These in turn act quickly to remove any burned or foreign matter from the sides and bottom of the pan, thereby rendering the latter clean and bright. The matter removed from the pan falls onto the guard $g$ below and from the latter to the table or base. This guard, it may be observed, further serves to prevent the "scrapings" from dropping into the gearing. The head $d$ may be fitted or provided with several series of blades varying in size and shape, the substitution of one set of blades for another being readily effected when desired by simply removing the pivot-screws $s$ and mounting thereon the substitute blades, followed by resecuring the screws to the head.

I claim as my invention and desire to secure by United States Letters Patent—

The pan-cleaning machine hereinbefore described, the same consisting of a frame or standard, a pair of bevel-gears, $c, c'$, spindles $a^3, b$, on which said gears are respectively mounted, and a head or spider, removably secured to the spindle $b$, having a series of suitably-shaped scraper-blades $e$ pivoted thereto, substantially as hereinbefore described and shown and for the purpose set forth.

Signed by me, at Providence, Rhode Island, this 27th day of December, A. D. 1900.

ROBERT HENKEL.

Witnesses:
   GEO. H. REMINGTON,
   GRACE E. SMITH.